United States Patent
Umamine et al.

(10) Patent No.: US 8,136,950 B2
(45) Date of Patent: Mar. 20, 2012

(54) OPTICAL SYSTEM UNIT AND PROJECTOR HAVING TWO-PLANED LIGHT ABSORBING PLATE

(75) Inventors: Osamu Umamine, Fussa (JP); Masanori Ohta, Akishima (JP)

(73) Assignee: Casio Computer Co., Ltd., Tokyo (JP)

(*) Notice: Subject to any disclaimer, the term of this patent is extended or adjusted under 35 U.S.C. 154(b) by 1183 days.

(21) Appl. No.: 11/880,637

(22) Filed: Jul. 23, 2007

(65) Prior Publication Data
US 2008/0018553 A1    Jan. 24, 2008

(30) Foreign Application Priority Data
Jul. 24, 2006    (JP) ................. 2006-201218

(51) Int. Cl.
*G03B 21/16*    (2006.01)
(52) U.S. Cl. ........................................ 353/52
(58) Field of Classification Search ............ 353/52, 353/56, 122; 348/771; 359/820
See application file for complete search history.

(56) References Cited

U.S. PATENT DOCUMENTS

| 6,751,027 B2 * | 6/2004 | Van Den Bossche et al. .............. 359/634 |
| 2002/0126263 A1 | 9/2002 | Konishi |
| 2005/0237620 A1 * | 10/2005 | Hsu et al. .............. 359/618 |

FOREIGN PATENT DOCUMENTS

| JP | 2000-098491 A | 4/2000 |
| JP | 2002-258405 A | 9/2002 |
| JP | 2004-212727 A | 7/2004 |
| JP | 2004-258439 A | 9/2004 |

OTHER PUBLICATIONS

Japanese Office Action (and English translation thereof) dated Jul. 11, 2002, issued in a counterpart Japanese Application.
Japanese Office Action (and English translation thereof) dated Sep. 25, 2008, issued in a counterpart Japanese Application.

* cited by examiner

*Primary Examiner* — Thanh X Luu
(74) *Attorney, Agent, or Firm* — Holtz, Holtz, Goodman & Chick, PC

(57) ABSTRACT

An optical system unit of a projector of the invention includes an illumination side block, an image producing block and a projection side block, the image producing block, in which a DMD display device is fixed which reflects rays of "off" state light to the outside of an entrance opening of a projection side optical system, has a resin accommodation case and a metallic light absorbing portion which is disposed on an inner surface of the accommodation case, an inner surface of the light absorbing portion has heat resisting properties and light absorbing properties, and the accommodation case has in an upper surface thereof a cooling opening for preventing the overheating of the resin which forms the accommodation case.

8 Claims, 9 Drawing Sheets

OPTICAL SYSTEM UNIT AND PROJECTOR HAVING TWO-PLANED LIGHT ABSORBING PLATE

BACKGROUND OF THE INVENTION

1. Field of the Invention

The present invention relates to an optical system unit and a projector including the optical system unit.

2. Description of the Related Art

Currently, a data projector is used in many cases to project an image displayed on a screen of a personal computer, an image of a video signal and, furthermore, an image by image data stored on a memory card on to a screen.

In many cases, this data projector employs a small, highly luminescent light source such as a metal halide lamp or an extra-high pressure mercury vapor lamp and is configured such that light emitted from the light source is split into three, red, green and blue, primary color components so as to be shone on to a display device referred to as a liquid crystal or DMD (Digital Micro Device) by a light source side optical system, and light transmitted through or reflected on the display device is projected on to a screen via a group of lenses which is referred to as a projection side optical system having a zooming function.

When projecting light from the light source unit, the DMD projects the light by controlling micromirrors in such a manner that light shone on to the micromirrors are reflected thereby towards the projection side optical system as light in an "on" state, while when not projecting light from the light source unit, the DMD controls the micromirrors in such a manner that light shone on to the micromirrors are reflected thereby towards positions where the light is not incident on the projection side optical system as light in an "off" state.

Then, due to the "off" state light being absorbed within an interior of the projector so as not to be incident on the projection side optical system, heat is generated in a portion where the light is so absorbed, and therefore, a space is provided where the heat so generated is dissipated.

In addition, in the projector employing the DMD, part of the "off" state light is incident on the projection side optical system as stray light, whereby a problem of deterioration of a projected image or reduction in luminescence has been caused by the stray light.

To cope with this, the Japanese Unexamined Patent Publication No. 2004-258439 proposes an invention which prevents the incidence and transmission of the stray light on and through the projection side optical system by disposing a light absorbing plate which disturbs the propagation of light which would make up stray light on an illumination side optical system.

In a conventional projector, however, since a light absorbing position to which "off" state light is shone on is heated to a high temperature, a cooling mechanism for the position to which the "off" state light is shone on becomes complex in construction, this making it difficult to make the projector small in size or thin in thickness.

In addition, the optical system unit needs to be formed by employing a highly heat-resistant metal in the position to which the "off" state light is shone on, and this has constituted a barrier when attempting to form components therefor by employing resin.

The invention has been made in view of the problems inherent in the related art that have been described above, and an object thereof is to provided an optical system unit which can be formed by employing resin or the like and which has a high cooling efficiency and a small projector which includes the optical system unit.

SUMMARY OF THE INVENTION

According to a preferred aspect of the invention, there is provided an optical system unit in which light from a light source is shone on to a display device and rays of "on" state light produced when the light so shone on to the display device is reflected thereby are projected while being enlarged by a projection side optical system, including an image producing block in which the display device is fixed in such manner as to reflect rays of "off" state light to the outside of a light entrance opening of the projection side optical system, wherein the image producing block has a resin accommodation case and a metallic light absorbing plate which is disposed on an inner surface of the accommodation case, wherein a surface having heat-resisting properties and light-absorbing properties is formed on an inner surface of the light absorbing plate, and wherein the accommodation case has a cooling opening in an upper surface thereof.

In addition, according to another preferred aspect of the invention, there is provided a projector having a control unit, a light source unit and an optical system unit including various types of optical systems, the optical system unit being such that light from a light source is shone on to a display device and rays of "on" state light produced when the light so shone on to the display device is reflected thereby are projected while being enlarged by a projection side optical system and including:

an image producing block in which the display device is disposed in such manner as to reflect rays of "off" state light to the outside of a light entrance opening of the projection side optical system, wherein the image producing block has a resin accommodation case and a metallic light absorbing plate which is disposed on an inner surface of the accommodation case, wherein a surface having heat-resisting properties and light-absorbing properties is formed on an inner surface of the light absorbing plate, and wherein the accommodation case has a cooling opening in an upper surface thereof.

DETAILED DESCRIPTION OF THE PREFERRED EMBODIMENTS

Figure 1:
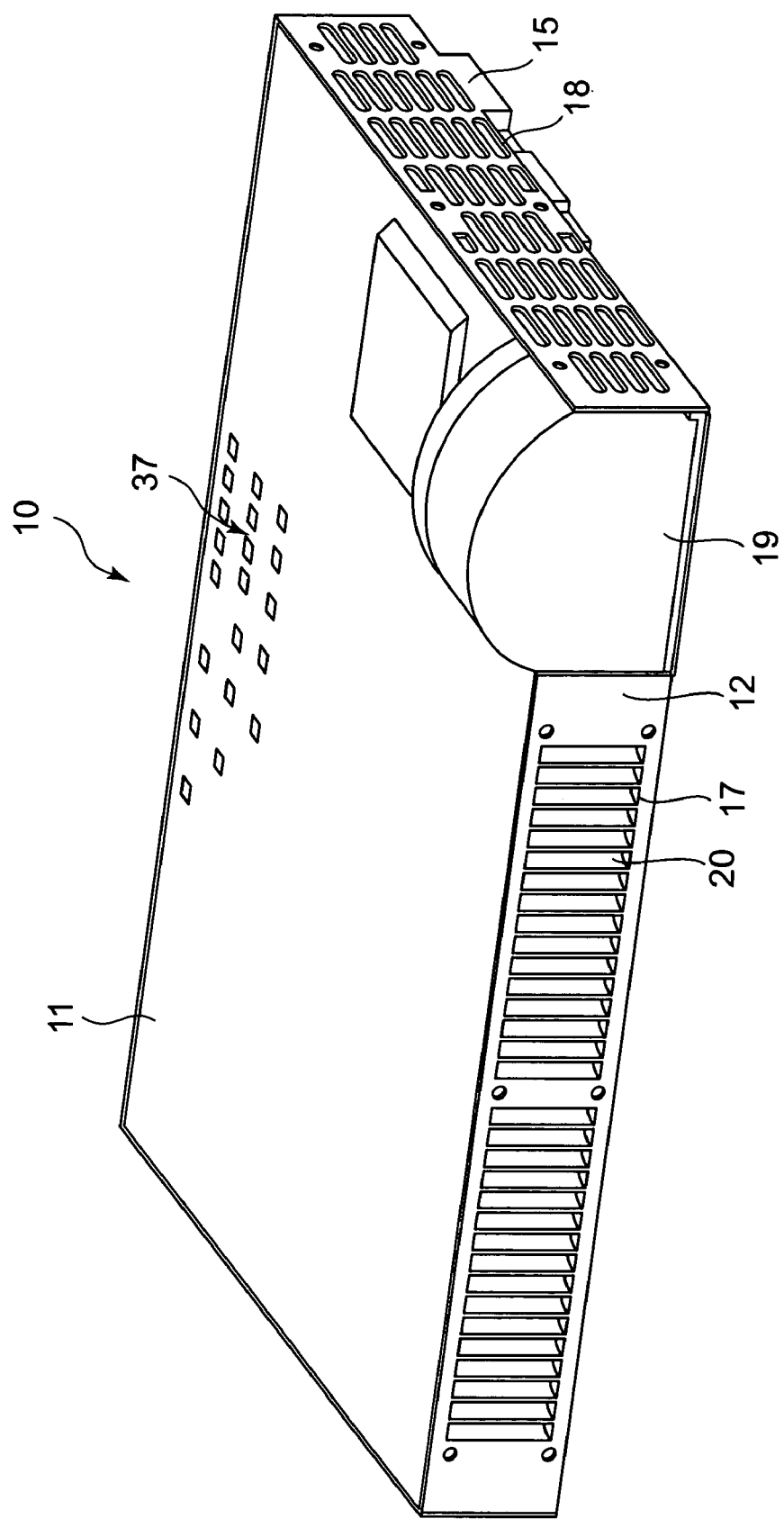
FIG. 1 is a perspective view of a projector according to an embodiment of the invention.

A projector 10 according to a best mode for carrying out the invention has a control unit 38, a light source unit 63, an optical system unit 77 including various types of optical systems and a cooling fan for cooling the light source unit 63.

The optical system unit 77 includes an illumination side block 78, an image producing block 79 and a projection side block 80, and the image producing block 79 has a resin accommodation case 66, and a metallic light absorbing plate 67 disposed on an inner surface of the accommodation case 66, a surface having heat resisting properties and light absorbing properties being formed on an inner surface of the light absorbing plate 67 by painting the inner surface with a point having heat resisting properties and light absorbing properties.

In addition, the image producing block 79 is such as to connect the illumination side block 78 with the projection side block 80 in such a manner that light emitted from the light source 63 is refracted for projection.

Furthermore, the illumination side block 78 includes a first reflecting mirror 72 for reflecting light from the light source unit 63, a color wheel 71, a wheel motor 73, and a light tunnel 75, the image producing block 79 includes a second reflecting mirror 74, an illumination mirror 84, a light source side lens group 83, and a display device 51 and the projection side block 80 includes a projection side optical system 62.

In addition, the optical system unit 77 is configured such that light from the light source is shone on to the display device 51 via the color wheel 71 and an integrator rod such as the light tunnel 75, the lens group, and furthermore, the various types of mirrors, and the light so shone on to the display device 51 is reflected thereon to be formed into rays of "on" state light which produce an image and rays of "off" state light, so that the rays of "on" state light are enlarged and projected by the projection side optical system 62, while the rays of "off" state light are reflected towards an upper surface of the image producing block 79 which lies outside of an entrance opening of the projection side optical system 62.

Then, the accommodation case 66 has openings in a connecting portion with the illumination side block 78 and a connection portion with the projection side block 80, and furthermore, in the vicinity of the display device 51 and in a bottom portion thereof. In addition, the light absorbing plate 67, which is disposed inside the accommodation case 66, is formed into an L-shape in section by an upper surface portion 67a and a front surface portion 67b and is so disposed with the front surface portion 67b made to internally contact an inside of a surface of the accommodation case 66 where the accommodation case 66, which makes up the image producing block 79, is connected with the projection side block 80 and the upper surface 67a made to internally contact an inside of an upper surface of the accommodation case 66. Furthermore, the accommodation case 66 has a cooling opening 68 provided in a position where the rays of "off" state light are shone on to an inner surface thereof from the display device 51, and this cooling opening 68 is formed substantially into the same shape as a shape in which a bundle of rays of "off" state light is shone on to the light absorbing plate 67 over a range which is wider than an area where the bundle of rays of "off" state light is shone.

Hereinafter, embodiments of the invention will be described in detail based on the drawings. As is shown in FIG. 1, a projector according to one embodiment of the invention is formed substantially into a rectangular parallelepiped shape and has a lens cover 19 which covers a projection opening provided on a side of a front surface panel 12 which is a front side panel of a main body case. In addition, a plurality of air discharge holes 17 are provided in the front surface panel 12, and the respective air discharge holes 17 have louvers 20 which prevent the leakage of light in the main body case or a housing to the outside and the discharge of hot air in the housing towards the front of the projection opening.

In addition, a key/indicator unit 37 is provided on the upper surface panel 11 which makes up the main body case, and this key/indicator unit 37 has keys and indicators such as a power supply switch key, a power indicator which indicates that the power supply is on or off, a lamp switch key which turns on a lamp of the light source unit, a lamp indicator which indicates that the lamp is illuminated and an overheat indicator which informs that the light source unit is overheated.

Furthermore, on a rear side, not shown, of the main body case, an input/output connector unit where a USB terminal, an image signal input D-SUB terminal, an S terminal, an RCA terminal and the like are provided, a power supply adapter plug insertion port and an Ir receiving unit which receives a control signal from a remote controller are provided on a rear surface panel.

A plurality of air intake holes 18 are provided in a right-hand side panel 14 which is a side panel, not shown, of the main body case, as well as in a left-hand side panel 15 which is a side panel shown in FIG. 1.

Figure 2:
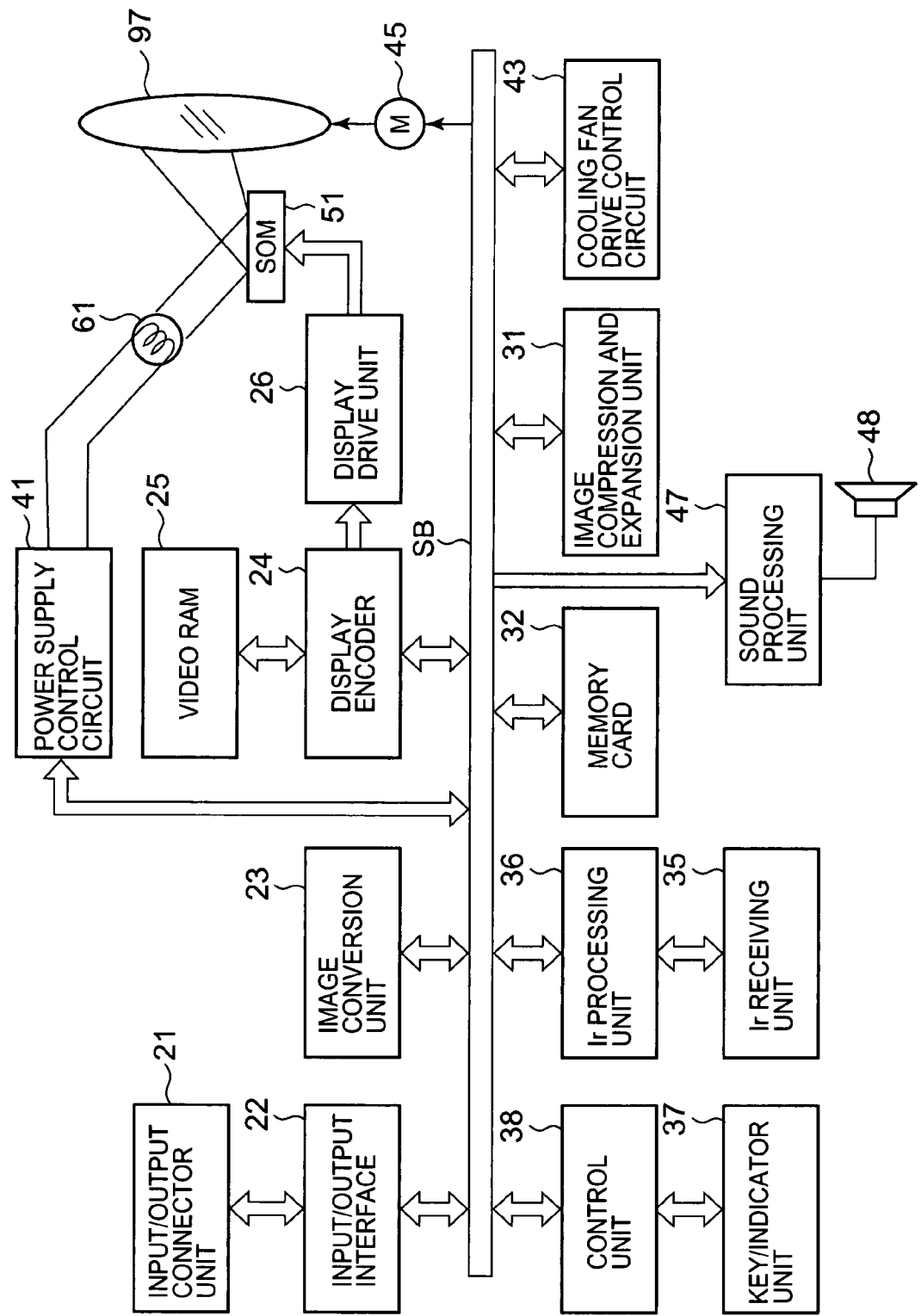
FIG. 2 is a control block diagram of the projector according to the embodiment of the invention.

As is shown in FIG. 2, a control circuit of the projector 10 has a control unit 38, an input/output interface 22, an image conversion unit 23, a display encoder 24, a display drive unit 26 and the like, whereby image signals of various standards are inputted from an input/output connector unit 21 are sent to the image conversion unit 23 via the input/output interface 22 and a system bus (SB), where they are converted to be united into an image signal in a predetermined format, and thereafter are sent to the display encoder 24.

In addition, the display encoder 24 deploys the image signal sent thereto over a video RAM 25 so that the image signal is stored therein, then produces a video signal from what is stored in the video RAM 25 and outputs the video signal so produced to the display drive unit 26.

Then, the display drive unit 26, to which the video signal is sent from the display encoder 24, drives the display device 51 which is a spatial optical modulator (SOM) at an appropriate frame rate which corresponds to the image signal sent thereto, and light from the light source unit 63 is caused to be incident on the display device 51 via a light source side optical system to be reflected thereon, so that an optical image is formed by reflected light from the display device 51, so as to be projected on to a screen, not shown, for display thereon via a and displayed on via a projection system lens group which makes up a projection side optical system. A movable lens component 97 in this projection system lens group is driven by a lens motor 45 for zooming adjustment and focusing adjustment.

In addition, an image compression and expansion unit 31 performs a recording process in which image signals are sequentially written on a memory card 32 which is a detachable recording medium by data compressing a luminance signal and a color difference signal of an image signal through a processing such as ADTC and Huffman coding and, in a reproducing mode, reads out the image data recorded on the memory card 32, expands frame by frame individual image data which make up a series of dynamic images and sends them to the display encoder 24 so as to enable the display of the dynamic images or the like based on the image data stored on the memory card.

The control unit 38 governs the control of operations in respective circuits within the projector 10 and is made up of a CPU, a ROM which fixedly stores various types of settings and operation programs, a RAM which is used as a work memory and the like.

In addition, a control signal of the key/indicator unit 37 which is made up of the main keys and indicators which are provided on the upper surface panel 11 of the main body case is sent out directly to the control unit 38, a key control signal from the remote controller is received at the Ir receiving unit 35, and a code signal that is demodulated at an Ir processing unit 36 is sent to the control unit 38.

Additionally, a sound processing unit 47 is connected to the control unit 38 via the system bus (SB), and the sound processing unit 47 includes a sound source circuit such as a PCM sound source and converts audio data into analog data so as to emit sound loudly in projection and reproduction modes by driving a speaker 48.

In addition, the control unit 38 also controls a power supply control circuit 41 in the following manner. When the lamp switch key is operated, the lamp 64 of the light source unit is illuminated by the power supply control circuit 41. When the lamp is so illuminated, the control unit 38 causes a cooling fan drive control circuit 43 to activate a temperature sensor provided on the light source unit or the like to detect a temperature so as to control the rotational speed of a cooling fan. When the lamp is turned off, the control unit 38 causes the cooling fan control circuit 43 to keep the cooling fan rotating a certain period of time after the lamp was turned off.

Figure 3:
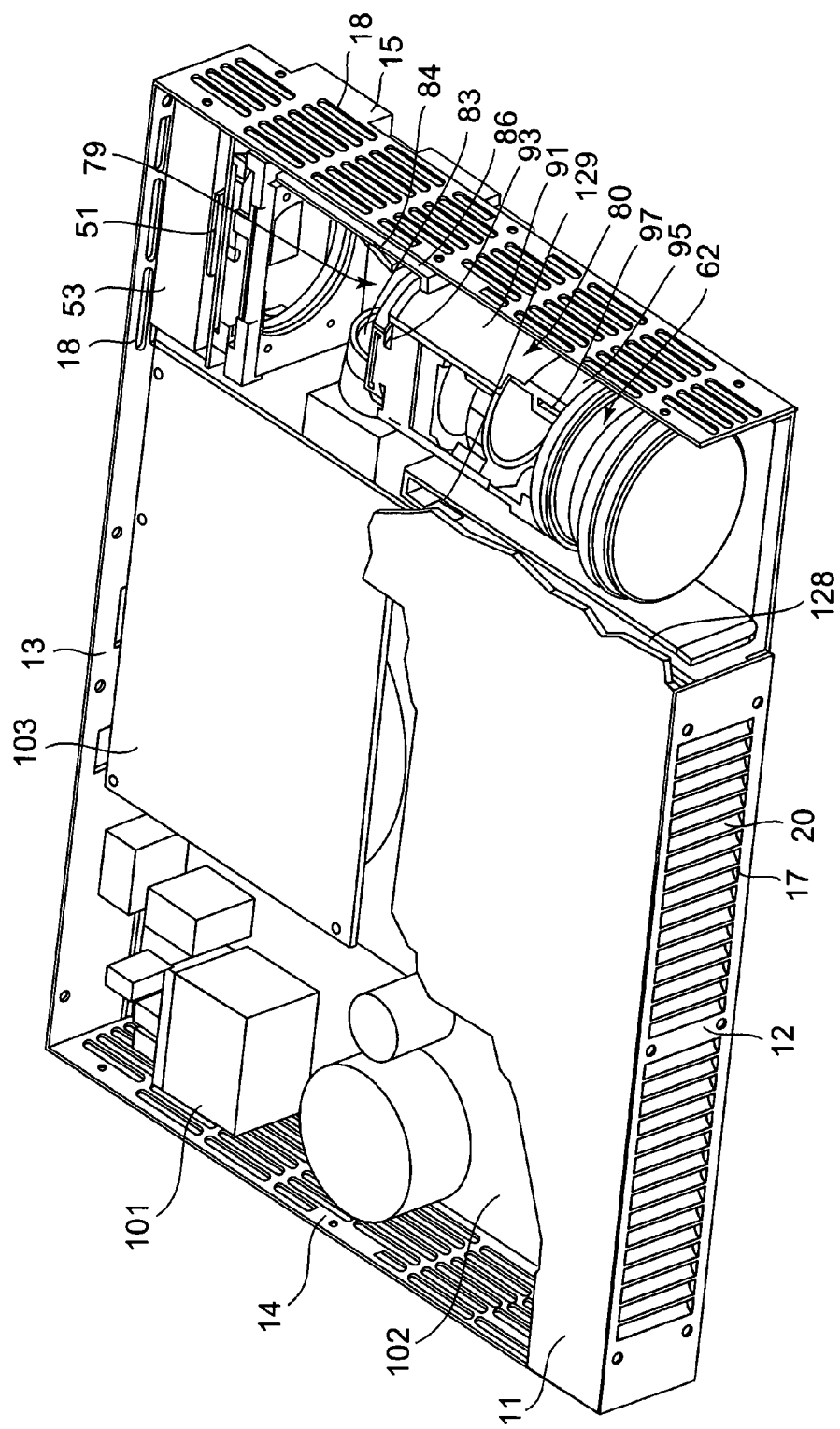
FIG. 3 is a perspective view showing the projector according to the embodiment of the invention with an upper surface panel thereof partially removed.

The ROM, RAM, IC and other circuit constituent elements are mounted on a control circuit board 103 as a main control board shown in FIG. 3, while the power supply control circuit 41, which makes up a power system, is built in a lamp power supply circuit block 101, whereby the control circuit board 103, which makes up the main control board of a control system and a power supply control circuit board 102 on which the lamp power supply circuit block 101 and the like are mounted are formed separately from each other.

Figure 4:
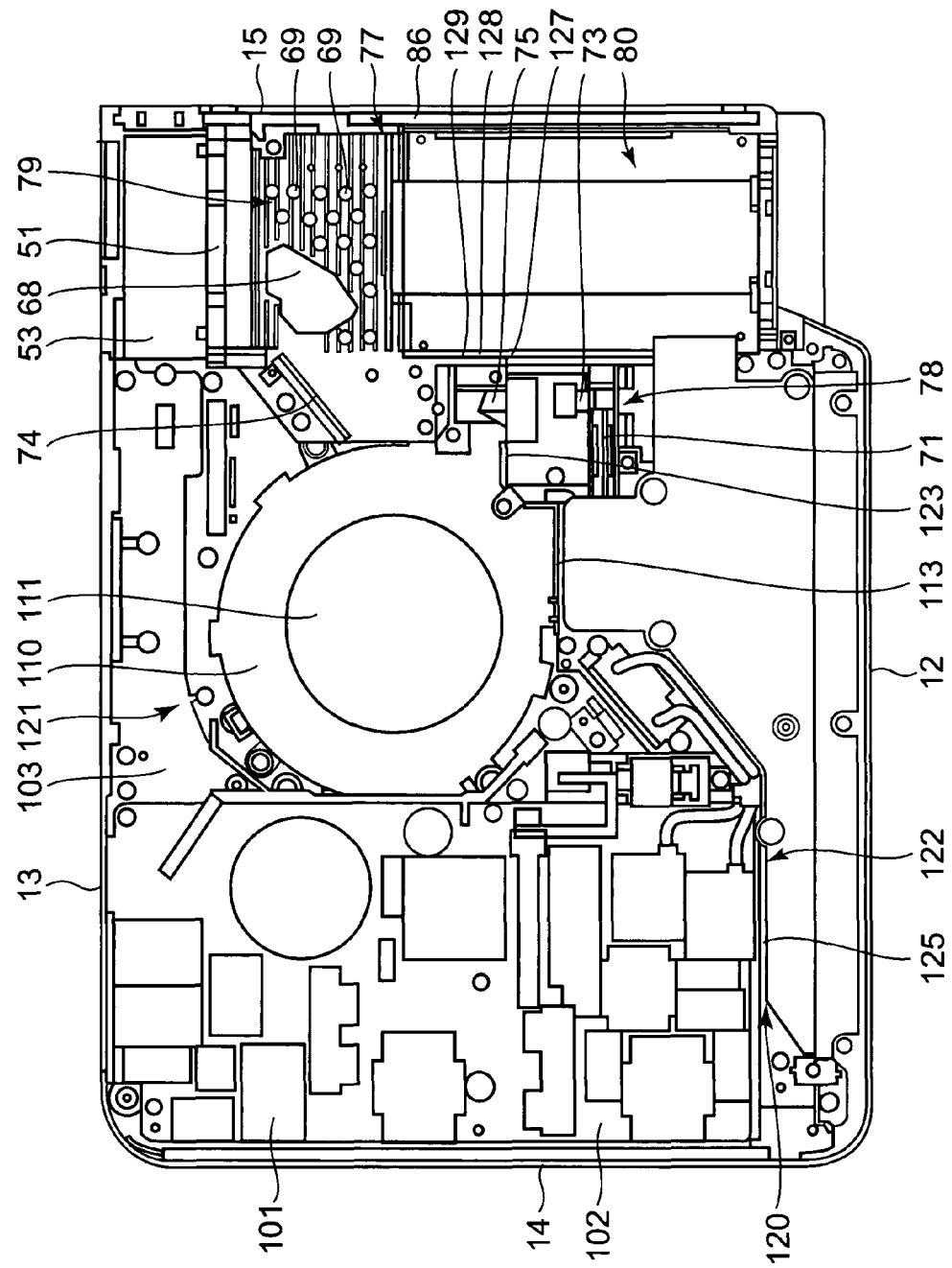
FIG. 4 is a plan view of the projector according to the embodiment of the invention with the upper surface panel thereof removed.
Figure 5:
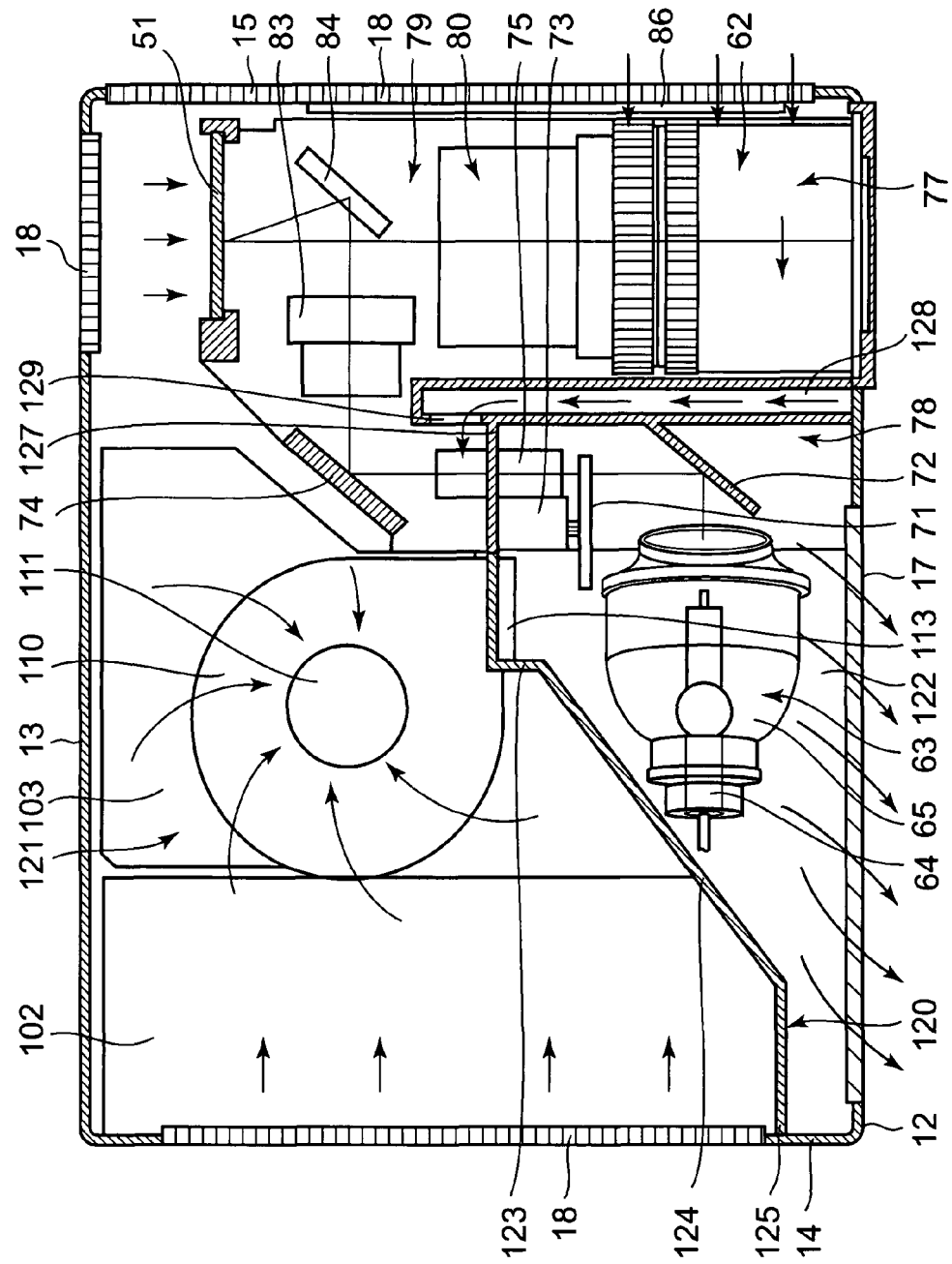
FIG. 5 is an explanatory view showing flows of air into and out of the projector according to the embodiment of the invention.

In addition, an interior of the projector 10 is constructed as is shown in FIGS. 3, 4 and 5. Namely, the power supply control circuit board 102, on which the lamp power supply circuit block 101 and the like are mounted, is disposed in the vicinity of the right-hand side panel 14, as is shown in FIG. 3, and as is shown in FIGS. 4 and 5, the interior of the housing is divided airtightly by a partition bulkhead 120 into an intake side space compartment 121 which lies on a rear surface panel 13 side of the partition bulkhead 120 and a discharge side space compartment 122 which lies on a front face panel 12 side of the partition bulkhead 120. A sirocco fan type blower 110 is disposed on a bottom surface panel 16 in a position lying in the vicinity of the rear surface panel 13 as a cooling fan in the intake side space compartment 121, and an outlet 113 of the blower 110 is disposed in such a manner as to open to the discharge side space compartment 122.

Furthermore, the light source unit 63 is disposed within the discharge side space compartment 122, and the optical system unit 77 is disposed to extend along the left-hand side panel 15 in such a manner that the illumination side block 78 of the optical system unit 77, which is made up of the illumination side block 78, the image producing block 79 and the projection side block 80, is made to open and communicate with the discharge side space compartment 122 so that part of the optical system unit 77 is positioned in the discharge side space compartment 122.

The light source unit 63 has an extra-high pressure mercury vapor lamp as the discharge lamp 64 which is provided in an interior of a reflector 65 which is covered on a front surface with an explosion proof glass.

In addition, as is shown in FIGS. 4 and 5, the optical system unit 77 is made up of the three blocks of the illumination side block 78 which lies in the vicinity of the light source unit 63, the image producing block 79 and the projection side block 80. The illumination side block 78 includes the first reflection mirror 72 which reflects light emitted from the light source unit 63 towards the color wheel 71, the color wheel 71 on which a red, green and blue light color filter are provided circumferentially and which is driven to rotate by the wheel motor 73, and the light tunnel 75 as an integrator rod which converts light which has passed through the filters of the color wheel 71 into a bundle of rays of light whose intensity is uniformly distributed across the width thereof. In addition, an illumination side block bulkhead 127 is provided between the illumination side block 78 and the image producing block 79 in such a manner as to be connected to the partition bulkhead 120 while allowing the light tunnel 75 to be passed therethrough.

In addition, the image producing block 79 has the second reflection mirror 74 which bends the path of light that has emerged from the light tunnel 75 at 90 degrees, the light source side lens group 83 which is made up of a plurality of lenses for causing light reflected by the second reflection mirror 74 to converge on the display device 51, the illumination mirror 84 which shines light that has passed through the light source side lens group 83 on to the display device 51 at a predetermined angle from obliquely below on a front side thereof and a lens which shines light that is to be shone on to the display device 51 on to the display device 51 as a bundle of parallel rays of light, and the image producing block 79 includes further a DMD (Digital Micromirror Device) which makes up the display device 51 and a display device unit for holding the display device 51.

This DMD is such as to divide light incident thereon from obliquely below on a front side thereof into rays of light which is in an "on" state which are reflected forwards and rays of light which is in an "off" state which are reflected obliquely upwards so as to form an image by switching directions in which a plurality of micromirrors are tilted. Light incident on the micromirrors which are tilted in one tilt direction is made into rays of "on" state light which are reflected forwards by the micromirrors so tilted, and light incident on the micromirrors which are tilted in the other tilt direction is reflected obliquely upwards by the micromirrors so tilted so as to be made into rays of "off" state light. While shining the rays of "off" state light towards an upper surface of the image producing block 79 in such a manner that they are prevented from being incident on the entrance opening of the projection side optical system 62, the DMD shines forwards the rays of "on" state light so as to produce an image for display.

Figure 6:
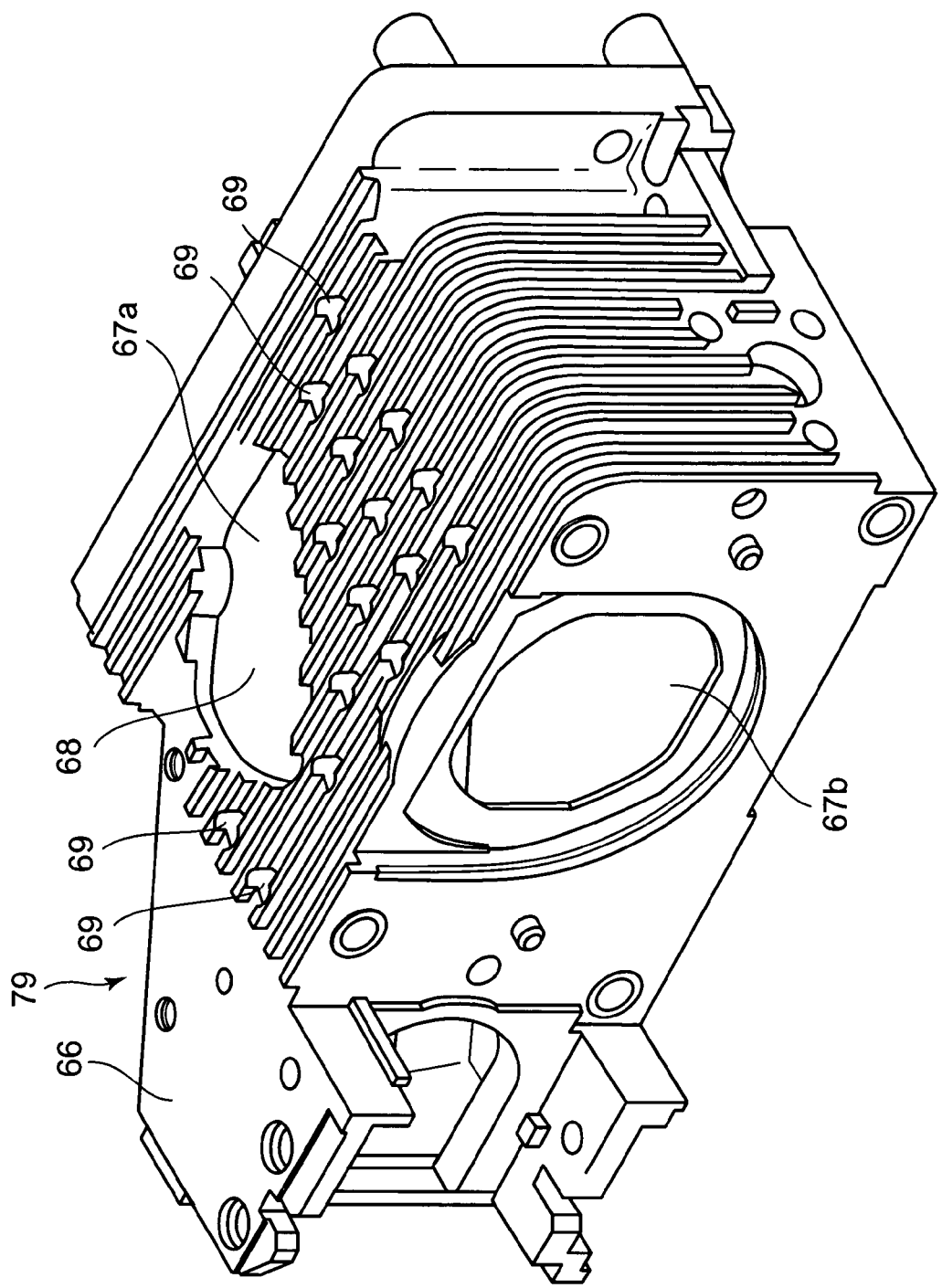
FIG. 6 is a perspective view of an image producing block according to the embodiment of the invention.

In addition, as is shown in FIG. 6, the image producing block 79 is formed in such a manner as to be covered by the accommodation case 66 which is formed from a resin or the like for protecting and supporting constituent members which are disposed in the image producing block 79. This accommodation case 66 has openings which are provided in the connecting portion with the illumination side block 78 and the connecting portion with the projection side block 80 in such a manner as to permit the passage of light therethrough and also has an opening which is provided in the vicinity of the display device 51 in such a manner as to permit the passage of light therethrough. The accommodation cover 66 has an opening in the bottom portion thereof for adjustment of the illumination mirror 84.

Furthermore, a plurality of linearly elongated irregular portions are provided on an outer surface of the accommodation case 66 which extends from the upper surface to a side surface thereof in such a manner as to form air flow paths, and additionally, a plurality of minute holes 69 are provided in the linearly elongated irregular portions formed on the upper surface of the accommodation case 66 so as to increase the cooling efficiency of the accommodation case 66.

Figure 7:
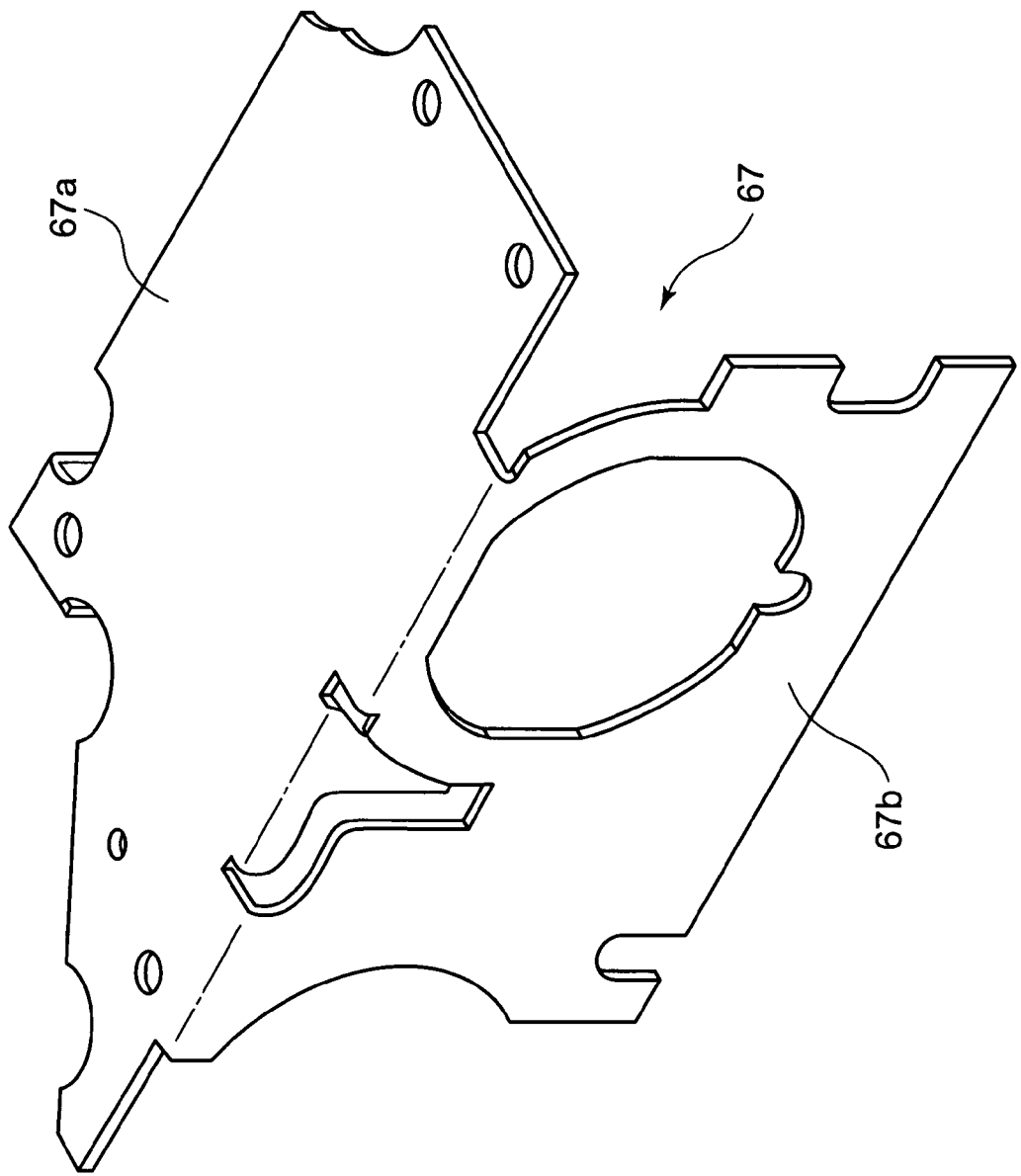
FIG. 7 is a perspective view of a light absorbing plate according to the embodiment of the invention.

In addition, as is shown in FIG. 7, the metallic light absorbing plate 67 is disposed on the inner surface of the accommodation case 66. An inner surface side of this light absorbing plate 67 is painted with a paint which has light absorbing properties and heat resisting properties, so as to absorb the rays of "off" light from the display device 51.

In addition, the light absorbing plate 67 is formed into the L-shape in section by the upper surface portion 67a which is formed into a horizontal flat plate shape and the front surface portion 67b which is formed into a vertical flat plate shape. The light absorbing plate 67 so configured is disposed fixedly in the accommodation case 66 in such a manner that the front surface portion 67b, which makes up one of the flat planes, is made to contact an inner surface of the side of the accommodation case 66 where the accommodation case 66 is connected to the projection side block 80, while the upper surface portion 67a, which makes up the other flat plane, is made to contact an inner surface of the upper surface of the accommodation case 66. In addition, the light absorbing plate 67 has an opening which is provided in the front surface portion 67b in such a manner as to permit the passage of rays of "on" state light which are shone towards the projection side block 80 from the display device 51.

Figure 8:
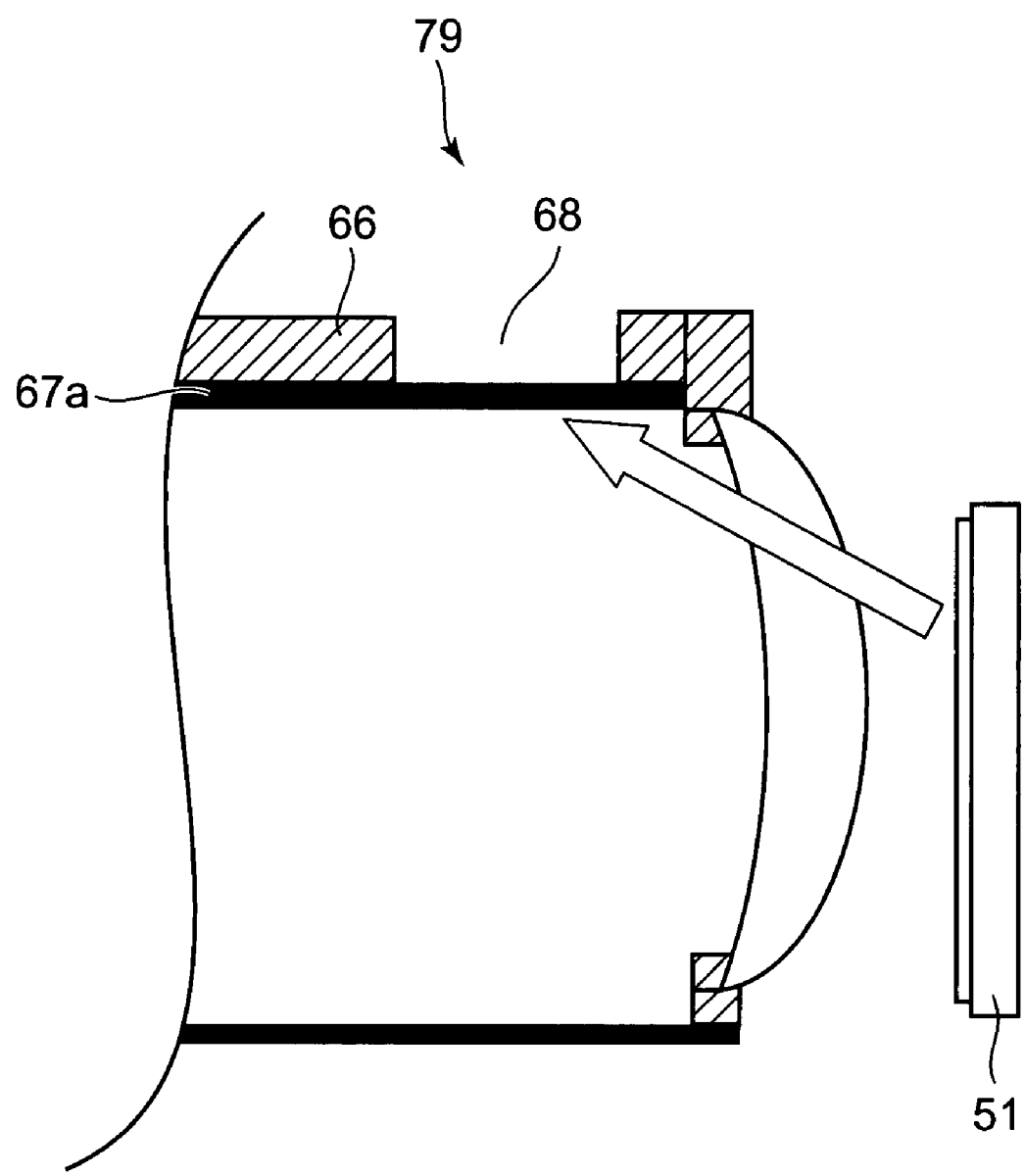
FIG. 8 is a partial sectional view of the image producing block according to the embodiment of the invention.

Furthermore, as is shown in FIGS. 4, 6 and 8, the accommodation case 66 has the cooling opening 68 which is provided in the upper surface thereof in the position where the rays of "off" state light are shone on to an inner surface thereof from the display device 51, and this cooling opening 68 is so formed substantially into the same shape as a shape in which a bundle of rays of "off" state light is shone on to the upper surface portion 67a. In this way, the upper surface of the light absorbing plate 67 in the position where the rays of "off" state light are shone to thereby be heated to a high temperature is exposed to the outside of the accommodation case 66 so as to increase the cooling efficiency of the position to which the rays of "off" state light are shone on. In addition, this cooling opening 68 is formed over the range which is wider than the area where the bundle of rays of "off" state light is shone.

In addition, the projection side block 80 has the lens group which makes up the projection side optical system 62 for emitting light which is reflected by the display device 51 so as to form an image towards a screen. The projection side optical system 62 is made up of a fixed lens component 93 which is built in a fixed lens barrel 91 and the movable lens component 97 which is built in a movable lens barrel 95, so as to be formed into a variable focus lens having a zooming function, in which the movable lens component 97 is shifted by the lens motor for zooming adjustment and focus adjustment.

In addition, an optical system control board 86 for controlling the zooming and focus adjustments of the projection side optical system is provided between the optical system unit 77 and the left-hand side panel 15, whereby the zooming function and the focus adjustment are enabled by controlling the operations of the movable lens barrel 95 and the movable lens component 97 by this optical system control board 86.

Additionally, the illumination side block 78 and the projection side block 80 are disposed neighboring to each other in such a manner as to form a narrow space 128 as a cooling air flow path between the blocks, and an external wall is provided in part of each of the blocks. In addition, the image producing block 79 is connected to an end portion of the illumination side block 78 and an end portion of the projection side block 80, respectively, and the optical system unit 77 is formed into a U-shape as a whole. Furthermore, the external wall of the illumination side block 78 which is heated to a high temperature is formed by utilizing a heat insulating member having low heat conductivity such as a resin.

Note that there also exists a case where the external wall of the illumination side block 78 is formed by employing a metal which is light in weight and high in heat conductivity such as aluminum in order for heat in the illumination side block 78 to be released to the outside.

In addition, the bulkhead 127 of the illumination side block 78 has a cutout 129 which functions as an air flow path in an upper portion in the vicinity of the light tunnel 75.

The blower 110 has an air inlet 111 which is positioned in the vicinity of the intake side space chamber 121, and the outlet 113 is formed substantially into a square shape in section and in such a manner as to be connected to the partition bulkhead 120, whereby air discharged from the blower 110 is then discharged into the discharge side space compartment 122 which is divided by the partition bulkhead 120 and the illumination side block bulkhead 127 of the illumination side block 78. Note that the control circuit board 103 is provided in the vicinity of the inlet 111 of the blower 110.

Namely, the partition bulkhead 120 divides the interior of the projector 10, as is shown in FIG. 5, into the intake side space compartment 121 in which the components having relatively low temperatures such as the optical systems and circuit boards are disposed and the discharge side space compartment 122 in which the component heated to a high temperature such as the light source unit 63 and the constituent components of a light source section such as the first reflection mirror 72 and the color wheel 71 are provided.

As is shown in FIG. 5, this partition bulkhead 120 is made up of a first bulkhead 123, a second bulkhead 124, a third bulkhead 125, which are each formed into a plate shape, and furthermore, an upper surface bulkhead and a lower surface bulkhead, which are not shown.

The first bulkhead 123 is connected to an end portion of the illumination side block bulkhead 127 of the optical system unit 77 and extends substantially in parallel with the front surface panel 12 from the end portion of the bulkhead of the optical system unit 77 so as to constitute a partition as far as a position where the outlet 113 of the blower 110 is passed therethrough. The first bulkhead 123 is a bulkhead which is provided to discharge air from the outlet 113 of the blower 110 into the discharge side space compartment 120 completely.

Furthermore, the second bulkhead 124 is disposed in such a manner as to extend obliquely from an end portion of the first bulkhead 123 towards the front surface panel 12 so that the light source unit 63 is positioned in the discharge side space compartment 122, and the third bulkhead 125 is disposed in such a manner as to extend from an end portion of the second bulkhead 124 to the right-hand side panel 14 in parallel with the front surface panel 12 to separate the intake side space compartment 121 from the discharge side space compartment 122 over the relevant portion. These second bulkhead 124 and third bulkhead 125 are bulkheads which are provided to separate the power supply control circuit board 102 and the like from the discharge side space compartment 122.

In addition, the upper surface bulkhead and the lower surface bulkhead are disposed to prevent heat from being conducted directly to the upper surface panel 11 and the bottom surface panel 16, respectively, and are configured to form spaces between the discharge side space compartment 122 and the upper surface panel 11 and the bottom surface panel 16, respectively.

Note that as with the optical system unit 77, a heat insulating material such as resin is used for the first bulkhead 123, the second bulkhead 124 and the third bulkhead 125, whereby high-temperature heat emitted from the light source unit 63 within the discharge side space compartment 122 is prevented from leaking to the outside of the discharge side space compartment 122.

Next, flows of air within the projector 10 will be described. As is shown in FIG. 5, the air intake holes 18 are provided in the rear surface panel 13 in a position lying to the rear of a location where the display device 51 is positioned, so as to form an air flow path between the rear surface panel 13 and the optical system unit 77 which incorporates therein the display device 51, whereby outside air taken into from the air intake holes 18 provided in the rear surface panel 13 and the air intake holes 18 provided in the rear of the left side panel 15 is made to flow toward the blower 110 along the rear surface panel 13.

In addition, a display device heat radiating plate is disposed at the rear of the display device. Additionally, the control circuit board 103 is made up of two control boards.

Air flowing between the two control circuit boards 103 and along above or below of the two control circuit boards 103 is made to be taken into the blower 110 from the inlet 111 thereof.

Consequently, when a fan of the blower 110 is caused to rotate, the blower 110, which is the cooling fan, takes thereinto air lying on the periphery thereof from the inlet 111, and by taking thereinto air lying thereround in the interior of the projector 10, the blower 110 can take outside air into the interior of the projector 10 from the large number of air intake holes 18 which are provided in the side panels of the housing of the projector 10.

Then, part of the outside air that is so taken in from the air intake holes 18 provided in the left-hand side panel 15 and the rear surface panel 13 flows through the air flow path between the rear surface panel 13 and the optical system unit 77 in such a manner as to cool the display device heat radiating plate and continues to flow along the upper surface and the lower surface of the control circuit boards 103 and through the space formed between the control circuit boards 103 to thereby be taken into the blower 110 from the inlet 111 thereof. In addition, the remaining portion of the outside air taken in from the air intake holes 18 in the left-hand side panel 15 cools the optical system unit 77.

Furthermore, part of outside air that is taken into the interior of the projector 10 from the air intake holes 18 in the right-hand side panel 14 passes along the periphery of the lamp power supply circuit block 101 or the like to reach the control circuit board 103 while cooling the power supply circuit board 102 and then continues to flow along the control circuit board 103 to eventually be taken into the blower 110 from the inlet 111 thereof. In addition, the remaining part of the outside air flows along the first bulkhead 121 to eventually be taken into the blower 110 from the inlet 111 thereof.

Then, part of air discharged from the blower 110 to be blown into the discharge side space compartment 122 flows along the color wheel 71, and most of the discharged air flows round the periphery of the light source unit 63 which is heated to a high temperature. In addition, part of the discharged air that flows round the periphery of the light source unit 63 flows in such a manner as to pass through an interior of the reflector 65 from an opening formed in the reflector 65, while the remaining part thereof flows in the vicinity of the first reflecting mirror 72 and the color wheel 71 so as to cool not only the light source unit 63 but also the respective constituent components of the light source portion.

In this way, the high-temperature air resulting from cooling the light source unit 63 and the respective constituent components of the light source section expands over the whole front surface panel 12 to eventually be discharged from the air discharge holes 17 provided in the front surface panel 12. In addition, since the louvers 20 are mounted in the air discharge holes 17, light in the interior of the discharge side space compartment 122 is interrupted in attempting to escape therefrom to thereby be restricted from leaking to the outside, and discharge air temperature to be discharged outside can be reduced. Furthermore, since the louvers 20 are mounted in such a manner as to be angled towards the right-hand side panel 14, the highly heated air can be prevented from being discharged towards the front of the projection side optical system 62.

In addition, air flows in the vicinity of the optical system unit 77 in such a way that part of outside air taken in from the air intake holes 18 in the left-hand side panel 15 is flows through a space between the projection side block 80 of the optical system unit 77 and the bottom surface panel 16 and also flows into the narrow space 128 between the illumination side block 78 and the projection side block 80, so as to prevent the transmission of the high-temperature heat in the illumination side block 78 to the projection side block 80.

Additionally, the air that has flowed into the narrow space 128 then flows into the intake side space compartment 121 from the cutout 129 and is, furthermore, taken into the blower 110 from the inlet 111 thereof to eventually be discharged into the discharge side space compartment 122.

Then, part of outside air taken in from the air intake holes 18 in the left-hand side panel 15 flows along the upper surface of the image producing block 79 of the optical system unit 77 to eventually be taken into the blower 110 from the inlet 111 thereof.

The image producing block 79 has the plurality of linearly elongated irregular portions over the upper surface and side surface of the accommodation case 66 so as to increase its surface area, and furthermore, the plurality of minute holes 69 are provided in the upper surface of the accommodation case 66, so as to expose locally the light absorbing plate 67. In addition, the upper surface portion 67a of the light absorbing plate 67 is exposed through the cooling opening 68 which is formed into the shape in which the rays of "off" state light are shone in the portion on the upper surface of the accommodation case 66 which corresponds to the portion on the upper surface of the light absorbing plate 67 on to the inner surface of which the rays of "off" state light are shone. Consequently, the light absorbing plate 67 can be cooled with good efficiency.

On the other hand, in a conventional image producing block 79, when rays of "off" state light from a display device 51 are shone on to an upper surface of the image producing unit 79, a location of an accommodation case 66 which corresponds to the location of the image producing unit 79 where the "off" state light is shone on is heated to a high temperature. Because of this, in the event that the accommodation case 66 is formed from a resin or the like, with a light absorbing plate 67 positioned thereinside in such a manner as to be tightly secured thereto, there has been a fear that a drawback would be caused that the resin case is deformed or a gas is produced. On the contrary, with the image producing block 79 of the invention, the drawback inherent in the conventional counterpart is eliminated, whereby the image producing block 79 can be realized which is small in size and light in weight and in which the metallic light absorbing plate 67 is tightly secured to the inner surface of the resin accommodation case 66.

In addition, by disposing the light absorbing plate 67 in such a manner as to be situated on the internal sides of the upper surface and front surface of the accommodation case 66, there is eliminated a risk that the resin accommodation case 66 is directly illuminated by the rays of "off" state light from the display device 51, the formation of the accommodation case 66 from resin or the like being thereby facilitated.

Furthermore, with the conventional optical system unit 79, although there has been a problem inherent therein that stray light is produced for projection from part of the rays of "off" state light which are shone on to the accommodation case 66 of the image producing block 79, the production of such stray light can be reduced with the image producing block 79 of the invention.

In addition, since the accommodation case 66 of the image producing block 79 can be formed by employing resin or the like, the reduction in weight and price of the projector can also be realized.

Figure 9:
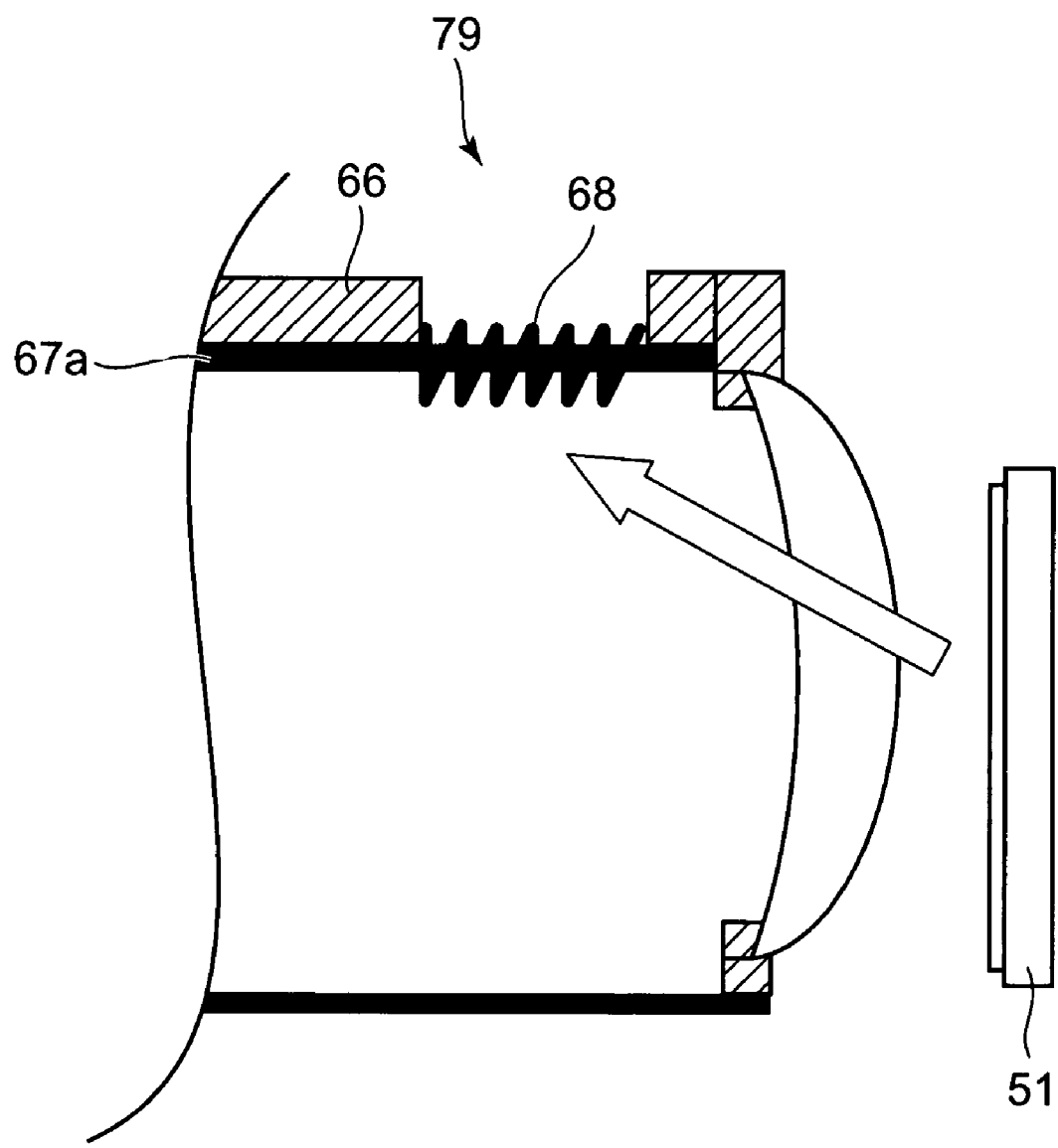
FIG. 9 is a partial sectional view of an image producing block according to another embodiment of the invention.

Note that as is shown in FIG. 9, a portion of the light absorbing plate 67 which corresponds to the position of the cooling opening 68 which corresponds, in turn, to the position to which the rays of "off" state light from the display device 51 are shone on can be formed into a wavy shape in section. By forming the relevant portion of the light absorbing plate 67 into the wavy shape in this way, the cooling efficiency is increased, thereby making it possible to increase the temperature reduction efficiency of the image producing block 79.

In addition, a plate-shaped material may be mounted on the upper surface of the light absorbing plate 67 in the position which corresponds to the position of the cooling opening 68 as a radiating fin.

Furthermore, the optical system unit 77 is not limited to the U-shaped configuration in which the optical axis of the illumination side block 78 and the optical axis of the projection side block 80 are made parallel to each other but may be formed into an L-shaped optical system unit in which an optical axis from the light source unit 63 to the illumination mirror 84 is made substantially parallel to the rear surface panel 13 and the optical axis of the projection side optical system 62 is made parallel to the left-hand side panel 15, and the color wheel 71 may be disposed between the illumination side block 78 and the light source unit 63.

Then, the invention is not limited to the embodiments that have been described heretofore and hence can be modified and/or improved freely without departing from the spirit and scope of the invention.

What is claimed is:

1. An optical system unit in which light from a light source is shone on to a display device and rays of "on" state light, produced when the light shone on to the display device is reflected thereby, are projected while being enlarged by a projection side optical system, the optical system unit comprising:

an image producing block in which the display device is disposed so as to reflect rays of "off" state light to an outside of a light entrance opening of the projection side optical system;

an illumination side block which incorporates therein an integrator rod; and a projection side block which incorporates therein the projection side optical system, wherein the image producing block has a resin accommodation case and a metallic light absorbing plate which is disposed on an inner surface of the accommodation case, wherein a surface having heat-resisting properties and light-absorbing properties is formed on an inner surface of the light absorbing plate, wherein the accommodation case has a cooling opening in an upper surface thereof, wherein the image producing block is connected to at least the illumination side block and the projection side block, and wherein the light absorbing plate has two planes of an upper surface portion and a front surface portion, which are both formed into a flat plate shape, so as to be formed into an L-shape in section, the front surface portion including a through hole and being made to contact an inner surface of a portion of the accommodation case where the accommodation case connects to the projection side block, and the upper surface portion being made to internally contact an upper surface of the accommodation case.

2. An optical system unit as set forth in claim 1, wherein the cooling opening is formed on the accommodation case in a position which corresponds to a portion of the light absorbing plate to which the rays of "off" state light are shone on.

3. An optical system unit as set forth in claim 2, wherein the cooling opening is formed over a range which is wider than an area on the light absorbing plate to which the rays of "off" state light are shone on.

4. An optical system unit as set forth in claim 1, wherein the light absorbing plate is formed into a wavy shape in section in a position thereof which corresponds to the position on the accommodation case where the cooling opening is formed.

5. An optical system unit as set forth in claim 1, wherein the light absorbing plate has a cooling fin on an outer surface thereof in a position which corresponds to the position on the accommodation case where the cooling opening is formed.

6. A projector comprising:

a control unit;

a light source unit; and an optical system unit including various types of optical systems, the optical system unit being such that light from the light source unit is shone on to a display device and rays of "on" state light, produced when the light shone on to the display device is reflected thereby, are projected while being enlarged by a projection side optical system, wherein the optical system unit comprises:

an image producing block in which the display device is disposed so as to reflect rays of "off" state light to an outside of a light entrance opening of the projection side optical system;

an illumination side block which incorporates therein an integrator rod; and a projection side block which incorporates therein the projection side optical system, wherein the image producing block has a resin accommodation case and a metallic light absorbing plate which is disposed on an inner surface of the accommodation case, wherein a surface having heat-resisting properties and light-absorbing properties is formed on an inner surface of the light absorbing plate, wherein the accommodation case has a cooling opening in an upper surface thereof, wherein the image producing block is connected to at least the illumination side block and the projection side block, and wherein the light absorbing plate has two planes of an upper surface portion and a front surface portion, which are both formed into a flat plate shape, so as to be formed into an L-shape in section, the front surface portion including a through hole and being made to contact an inner surface of a portion of the accommodation case where the accommodation case connects to the projection side block.

7. A projector as set forth in claim 6, wherein the cooling opening is formed on the accommodation case in a position which corresponds to a portion of the light absorbing plate to which the rays of "off" state light are shone on.

8. A projector as set forth in claim 7, wherein the cooling opening is formed over a range which is wider than an area on the light absorbing plate to which the rays of "off" state light are shone on.

* * * * *